Figure 1:
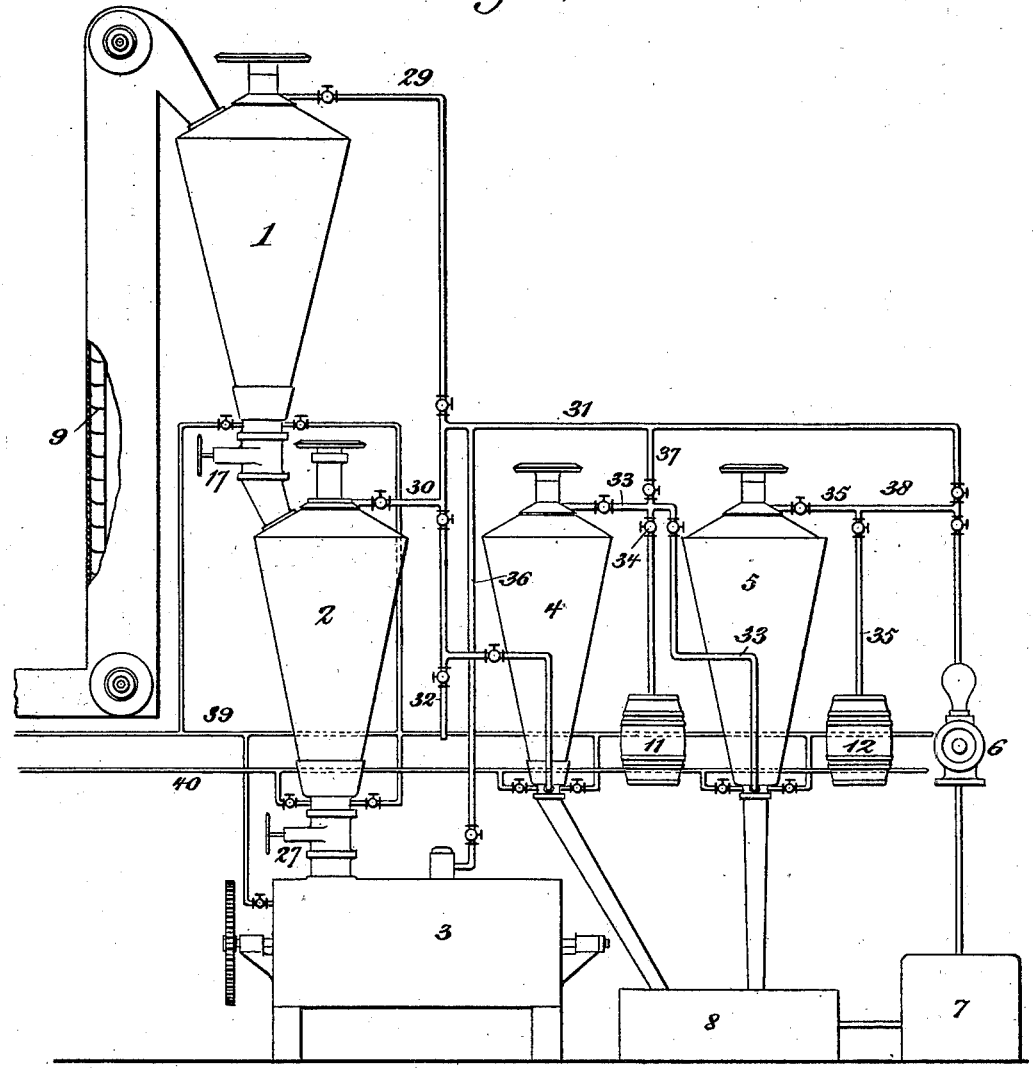

No. 668,297. Patented Feb. 19, 1901.
N. B. POWTER.
RENDERING APPARATUS.
(Application filed Dec. 21, 1898. Renewed Jan. 18, 1901.)
(No Model.) 3 Sheets—Sheet 2.
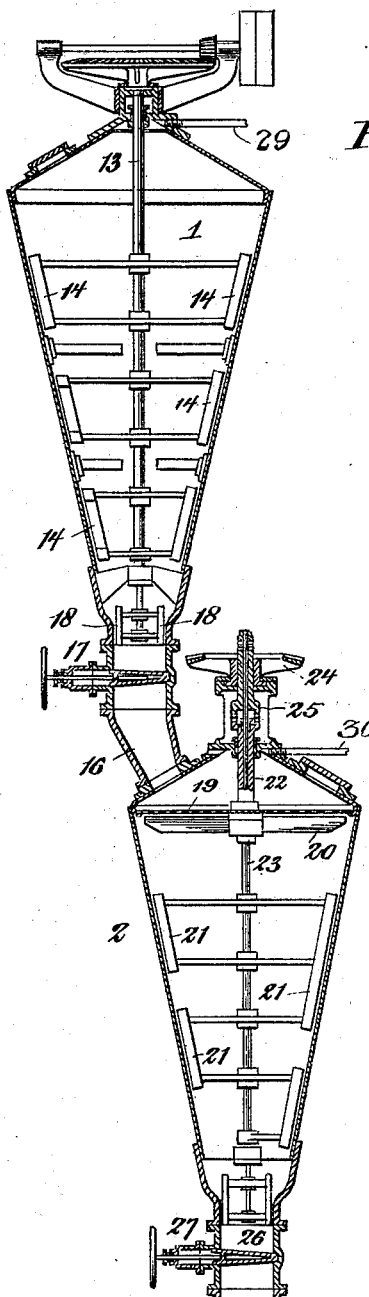
Fig. 2.
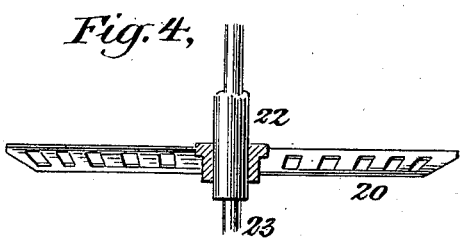
Fig. 4.
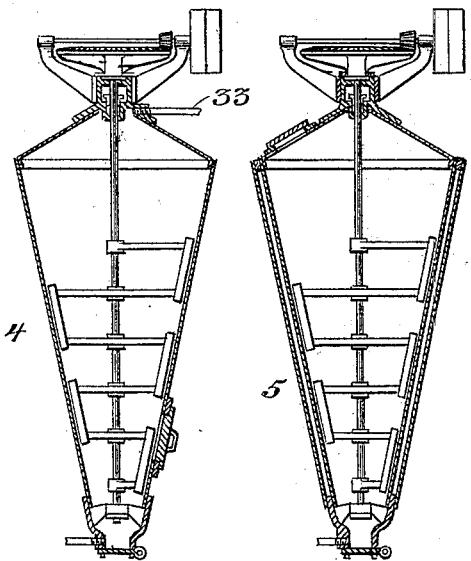
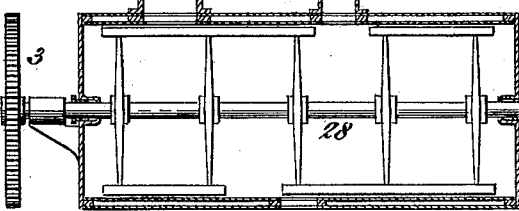
WITNESSES:
O. H. Hayford
Harry Goss
INVENTOR
Nathaniel B. Powter
By
E. M. Marble & Son
ATTORNEYS

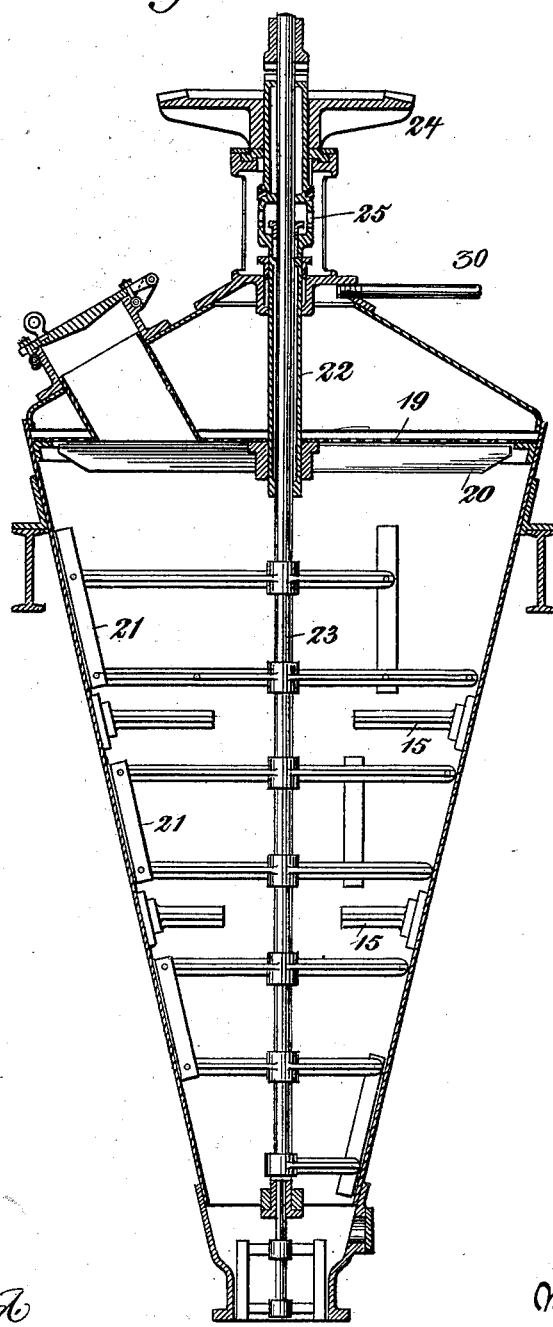

UNITED STATES PATENT OFFICE.

NATHANIEL B. POWTER, OF BROOKLYN, NEW YORK.

RENDERING APPARATUS.

SPECIFICATION forming part of Letters Patent No. 668,297, dated February 19, 1901.

Application filed December 21, 1898. Renewed January 18, 1901. Serial No. 43,758. (No model.)

*To all whom it may concern:*

Be it known that I, NATHANIEL B. POWTER, a subject of the Queen of Great Britain, residing in the borough of Brooklyn, in the county of Kings, city of New York, and State of New York, have invented a new and useful Apparatus for Extracting Grease and Oil from Oil-Bearing Substances; and I do hereby declare the following to be a full, clear, and exact description of the invention, such as will enable others skilled in the art to which it appertains to make and use the same.

My invention relates to an apparatus for extracting grease and oil from oil-bearing substances, and particularly from waste products—such as refuse meat, tallow, lard, tankage, garbage, town refuse, and fish waste—and from vegetable matter, such as linseed, hemp-seed, cotton-seed, cocoanuts, or any other vegetable material holding oil.

The apparatus herein described is particularly intended for the carrying out of the process of extracting grease and oil from oil-bearing substances, such as those mentioned above, which forms the subject-matter of a separate application, filed December 21, 1898, Serial No. 699,905.

My invention consists in the combination, with a suitable digester, of a separator, drier, purifiers, and vacuum apparatus, so connected together that the entire operation may be continued without the escape of odoriferous or deleterious gases, the oil and grease being drawn off in an odorless condition and the solid residue being converted into a dry and inoffensive powder.

My invention further consists in the construction of the digester and separator and in the means employed for effecting the separation of the grease from the solid matter.

The object of my invention is to extract oil and grease from oil-bearing substances, and particularly from substances such as those mentioned above, in a thorough, efficient, and economical manner and to avoid the liberation of offensive fumes. This object is attained in the apparatus herein described, and illustrated in the drawings which accompany and form a part of this specification, in which the same reference-numerals indicate the same or corresponding parts, and in which—

Figure 1 is a general elevation of the apparatus. Fig. 2 is a central vertical section of the digester, separator, drier, and purifiers, the pipe connections being omitted. Fig. 3 is an enlarged sectional view of an alternative form of digester adapted to perform the functions of both the digester and the separator of the apparatus shown in Figs. 1 and 2, and Fig. 4 is a detail view illustrating a form of screen-scraper which may be employed.

In the drawings, 1 is a digester; 2, a separator; 3, a drier; 4 and 5, purifiers; 6, a vacuum or suction pump; 7, a fume-trap, and 8 a tank for receiving the waste matter discharged from the purifiers.

9 is an elevator by which the grease-bearing substances may be delivered to the digester.

11 and 12 are barrels into which the grease and oil extracted may be passed.

The digester, separator, and purifiers are of the same shape, their form being that of two cones placed base to base. The digester has running through it a vertical shaft 13, provided with arms carrying stirring-blades 14, and between these stirring-arms are stationary projecting arms 15, secured to the sides of the digester. The digester is connected at its lower end with the separator 2 by a passage 16, provided with a gate-valve 17. The lower end of the shaft 13 is provided with stirring-arms 18, projecting downward into this passage 16, the function of which arms is to prevent solid matter from collecting at the bottom of the digester to such an extent as to block the outlet.

The separator 2 is provided with a transverse screen 19 near its upper end, the passage 16 being continued within the separator to an opening in the screen, through which the matter discharged from the digester may pass into the lower portion of the separator. Directly beneath the screen 10 is a revolubly-mounted screen-scraper 20, designed to prevent clogging of the screen, and below the scraper are revolubly-mounted stirring-arms 21, similar to the corresponding stirring-arms of the digester. No stationary arms located between the revolving stirring-arms are required, however. The arms of the screen-scraper 20 are inclined after the manner of the blades of a screw-propeller, so that in their movement they tend to throw backward and downward into the digester all of the solid matter floating in close proximity to the surface of the screen.

As shown in the drawings, the scraper 20 and the stirring-arms 21 are mounted upon separate but concentric shafts 22 and 23, respectively, which may be driven at will from a gear-wheel 24, itself driven from any suitable source of power in any convenient manner by means of a jaw-clutch 25; but both scraper and stirrers may be mounted upon the shaft 23 and so caused to rotate together, if preferred, the outer shaft 22 being omitted.

The separator 2 is smaller than the digester 1, for a reason which will be given hereinafter. The separator is connected at the bottom with the drier 3 by means of a passage 26, having in it a gate-valve 27. The drier is steam-jacketed and is provided with a series of stirring-arms mounted upon a shaft 28, by which said arms may be rotated.

To the digester 1 is connected, at the top, a pipe 29, leading downwardly to the bottom of the purifier 4. The separator 2 is also connected to this pipe 29 by a branch 30, entering the separator at the top, and a pipe 31, also connected to pipe 29, leads to the vacuum-pump 6. The pipe 29 is provided with a valve 32, through which grease may be drawn off without passing it into the separator 4, if desired. A pipe 33 is connected to the purifier 4 at the top and leads to the bottom of the purifier 5. To this pipe is connected a valve 34, through which oil may be drawn off into the barrel 11. The purifier 5 is provided with a pipe 35, through which grease or oil within it may be drawn off into the barrel 12. Purifiers 4 and 5 are connected by pipes 37 and 38 with the vacuum-pump 6.

The purifiers are provided with shafts and stirring-arms by which their contents may be stirred, if desired. The purifier 5 is provided with a steam-jacket, by which its contents may be heated to any desired temperature. The purifiers are arranged to discharge their fluid contents when desired into a tank 8.

36 is a pipe connecting the drier 3 with the vacuum-pipe 31.

37 and 38 are pipes connecting the pipes 33 and 35 with the vacuum-pipe 31.

39 and 40 are steam and water supply mains respectively connected to the digester, separator, and purifiers at the bottom.

The extraction of the grease is carried on as follows: The digester is charged with the material to be treated through a manhole in its top by means of the elevator 9 or in any other convenient manner. The manhole is then closed and steam is admitted to cook the contents of the digester, the stirring-arms being rotated, so as to grind and disintegrate the matter being treated. The cooking is continued from three to five hours, according to the nature of the substance treated, no escape of steam or fumes being allowed. The action of the steam and of the condensed vapor and the mechanical disintegration produced by the action of the stirring-arms breaks up the fibrous structure of the matter under treatment, liberating the oils and greases, while the solid matter settles to the bottom of the digester. For the treatment of some substances dilute sulfuric acid or other suitable reducing agent may be added to the mass within the digester. When the substance being treated contains glue and similar substances, salt may be added to the mass to restrain the glue from going over with the grease. When the mass in the digester has been sufficiently treated therein, connection with the vacuum-pump is opened and the steam and vapors are drawn out and caused to pass through the water in the tank 7. This I do for two reasons—first, to avoid the escape of odoriferous gases, and, second, to separate from the mass of grease and oil and other substances within the digester certain light oils and greases, which I have found will pass off with the steam and vapors when suction is applied in a practically-pure condition. By this means these lighter oils may be separated from the heavier oils and grease. The oil and grease thus carried off is caught by the water in the tank 7 and floats upon the top of the water and may be collected in any convenient manner. The vapors which pass through the water in the tank 7 are passed into a convenient furnace, such as the furnace of the boiler by which steam is supplied to the apparatus, and are burned, no odoriferous gases being allowed to escape. The fumes having been drawn off completely, the valve 17 in the passage connecting the digester and separator may be opened and the contents of the digester discharged into the separator. The size of the separator is so proportioned to that of the digester that a full charge of the digester after treatment, as above described, when transferred to the separator fills the latter almost up to its screen. Hence after the mass has settled down a comparatively small quantity of water admitted into the separator at the bottom will raise all of the oil and grease through the screen and cause it to pass off through the pipe 30 into the purifier 4 or otherwise. The separator having been charged as above described, water is admitted, as above mentioned, the stirring-arms being rotated, and the screen-scraper also, when necessary, and the grease and oil within the mass are caused to rise through the mass and are concentrated in the narrow conical top of the separator, passing off into the pipe 30 and so into the purifier 4. The propeller-like blades of the screen-scraper force downward the solid matter which tends to clog the screen, so as to permit passage of the oil and grease. The scraper is not revolved at a speed sufficient to prevent the rise of the oil and grease. To facilitate the rise of the grease, however, the blades of the scraper may be made of netting or may be provided with perforations, as shown in Fig. 4, through which liquid may pass while the floating solid matter is held back and forced downward by the blades. Before sufficient water has been added to raise the grease within the separator to the level of the discharge-opening suction may be applied to the separator to draw off any of the light oils capable of passing off in this manner and which have been raised to the surface of the mass by the action of the water. After the grease has been drawn off from the separator the admission of water is stopped, the gate-valve 27 opened, and the contents of the separator permitted to pass into the drier 3. The valve 27 is then closed, steam is admitted to the steam-jacket surrounding the drier, and the connection of the drier to the vacuum-pump being opened the drying of the contents of the drier is commenced, the stirring-arms being rotated, as required. Drying is continued until the mass within the drier is reduced to a dry pulverulent condition. The fumes liberated within the drier are drawn off by the suction-pump 6 and caused to pass through the water in the tank 7. The grease which is passed over into the purifier 4 is allowed to remain quiet therein for a time in order that any solid matter which may have been carried over with it may be allowed to settle. If any decomposed matter has passed over into the purifier 4, steam may be blown through the mass therein for a time and then dry air passed through it by means of a vacuum-pump, thus purifying the grease and drawing off all odoriferous vapors.

While the oil and grease are within the purifier 4 they may also be treated with any purifying liquid with which it may be desirable to treat them, the grease and oil being caused to pass up through said liquid in the purifier 4 by reason of their lighter specific gravity. The lighter oils may then be drawn off into the barrel 11 by admitting water into the purifier 4 at the bottom. The heavier greases, such as lard, may be passed over into the purifier 5 and heated by passing steam through the steam-jacket of said purifier until all water has been driven off. When this has been done, water may be admitted at the bottom of the purifier 5, so as to cause the grease within such purifier to pass out at the top thereof, the water being admitted so slowly that it is not mixed to any appreciable extent with the grease.

The operation of separating the grease from the solid matter, conducted in the separator 2, might be conducted in the degester itself, a digester being employed which has a screen and a screen-scraper, such as the digester illustrated in Fig. 3; but during the process of digestion the mass in the digester settles down, so as to occupy much less volume than when first charged into the digester. To float the oil, therefore, would require the admission of a very considerable quantity of water to the digester, and all water admitted to the digester must be evaporated in the drier 3. The admission of such an excessive quantity of water for the mere purpose of floating off the grease is obviated by passing the contents of the digester after digestion is completed into the separator 2, the size of which bears a proper proportion to the volume occupied by a full charge of the digester after the digestion is completed, and the use of such a separator independent of and separate from the digester results in an important economy both in time and in cost of treatment. The separator is to be considered, however, as forming a part of the digesting apparatus.

The drying of the solid residue might be conducted in the separator itself or in the digester itself if the separation of the grease from the solid matter also takes place in the digester; but this is not desirable, because such drying can be conducted more efficiently and economically in a vessel especially adapted for this purpose. Moreover, by using a separate digester, separator, and drier the process of digestion may be carried on in the digester while the separation of the grease from the solid matter of a previous charge is taking place in the separator and while the solid matter of a still earlier charge is being dried in the drier, the process being practically continuous.

The shape of the separator is important. The conical upward-tapering upper part of the separator causes the grease after rising above the screen to be concentrated at the mouth of the pipe through which it is removed, so that practically all of the grease may be removed from the separator without the passing over therewith of an appreciable quantity of water. By making the lower portion of the digester conical, with inwardly-tapering sides, it has been found that clogging of the mouth of the digester may be prevented and that when the valve 27 is opened the entire solid contents of the separator will fall into the drier.

It will be noted that throughout the operation of extracting and purifying the oil and grease and drying the residue there is no escape of vapors or gases into the outside air, the entire process being conducted in closed receptacles.

In some cases—as, for instance, in the fishing industry, when the treatment may be carried out on shipboard—the purifiers and drier may be omitted, the oils and grease being discharged directly from the separator or from a combined digester and separator, such as that shown in Fig. 3, (with or without the separate shaft 22 for carrying the screen-scraper,) into barrels or tanks, the residue being thrown overboard or utilized in any suitable manner.

When the oil-bearing substance treated contains no floating matter which it is necessary to restrain from going over with the grease, the screen and scraper in the separator or combined digester and separator may be omitted.

Having thus completely described my invention, what I claim, and desire to secure by Letters Patent, is—

1. In a grease-extracting apparatus, the combination, with closed digesting apparatus, and a closed drier connected therewith, of a suction apparatus, pipes connecting the same with said digesting apparatus and drier, and means in connection with said suction apparatus for collecting the grease drawn off thereby, substantially as described.

2. In a grease-extracting apparatus, the combination, with digesting apparatus, and purifying apparatus connected therewith, of a suction apparatus, pipes connecting the same with the digesting and purifying apparatus, and means in connection with said suction apparatus for collecting the grease drawn off thereby, substantially as described.

3. In an apparatus for extracting grease, the combination, with a digester, of a closed vessel arranged below said digester and connected therewith, said vessel being closed at the bottom but provided with means whereby a charge within it may be withdrawn and adapted to receive and hold the contents of the digester, said vessel having a grease-discharge outlet at its upper extremity, and the size of the said vessel being proportionate to the normal shrinkage in volume which takes place in a normal charge of the digester during its treatment therein, substantially as described and for the purpose set forth.

4. In an apparatus for extracting grease, the combination with a digester, of a separator of the type described, below said digester and connected therewith, said separator having suitable stirring-arms, and a grease-discharge outlet at its upper extremity, said separator being closed at the bottom but provided with means whereby a charge within it may be removed, and the size of the said separator being proportionate to the normal shrinkage in volume which takes place in a normal charge of the digester, during its treatment therein, substantially as described and for the purpose set forth.

5. In an apparatus for extracting grease, the combination, with a digester, of a separator below said degester and connected therewith, and adapted to receive and hold the contents of the digester, said separator being contracted at the top and being provided with means for admitting fluid to it, and, in the apex of its contracted portion, with an outlet for the oil and grease, whereby said oil and grease may be floated off from the other contents of the separator, substantially as described.

6. In a grease-extracting apparatus, the combination, with a digester, of a separator of the type described below the same and directly connected therewith, and provided with a screen in its upper part and with stirring-arms below the said screen, means for admitting fluid into the separator to elevate the fluid contents thereof above the screen, and a drier beneath said separator, and directly connected therewith, substantially as described.

7. A vessel for the treatment of grease and grease-bearing substances, the sides of which have the form of two cones with their bases toward each other, said vessel provided with a charging-opening, and at the bottom with a discharge-opening, and also provided with a grease-discharge outlet in the contracted end of the upper conical portion, and with means for admitting fluid to the interior, substantially as described.

8. A vessel for the treatment of grease and grease-bearing substances, the sides of which have the form of two cones with their bases toward each other, said vessel provided with a charging-opening, and a grease-discharge outlet in the contracted end of the upper conical portion, and at the bottom with a discharge-opening, and with revolving stirring-arms in the lower conical portion, and with means for admitting fluid to the interior, substantially as specified.

9. A vessel for the treatment of grease and grease-bearing substances, the sides of which have the form of two cones with their bases toward each other, said vessel being provided with discharge-openings at the top and bottom, with a vertical shaft carrying stirring-arms, certain of which project into the lower discharge-opening, and with stationary arms projecting between said stirring-arms, substantially as described.

10. An apparatus for extracting grease and oil from garbage and other oil-bearing substances, consisting of a vessel provided with an outlet for drawing off the grease or oil at the top, a screen behind said outlet, a propeller-like scraper immediately behind said screen adapted to impart motion away from the screen, and mechanism for rotating the scraper, substantially as described.

11. An apparatus for extracting grease and oil from garbage and other oil-bearing substances, consisting of a vessel provided with an outlet for drawing off the grease and oil at the top, a screen behind said outlet, a propeller-like scraper immediately behind said screen adapted to impart motion away from the screen to solid objects, but having in its arms perforations to permit the passage of liquid, and mechanism for rotating the scraper, substantially as described.

12. In an apparatus for extracting grease and oil from garbage and other oil-bearing substances, the combination, with a vessel having an outlet in its upper portion for drawing off the oil and grease, and a transverse screen below said outlet and below the level to which the fluid in the tank rises during the separation of the grease, arranged to prevent the passage of solid substances and dividing the vessel into a lower chamber arranged to receive the substances to be treated and an upper grease-collecting chamber in which the grease liberated in the lower chamber may collect, of a revolubly-mounted scraper below said screen having propeller-like arms adapted to impart motion away from the screen, and means for rotating the scraper, substantially as described.

In testimony whereof I hereunto affix my signature in the presence of two witnesses.

NATHANIEL B. POWTER.

Witnesses:
DANIEL W. ALLAMAN,
GEO. HASSLEMAN.